United States Patent [19]

Bain, Jr. et al.

[11] Patent Number: 4,803,622

[45] Date of Patent: Feb. 7, 1989

[54] PROGRAMMABLE I/O SEQUENCER FOR USE IN AN I/O PROCESSOR

[75] Inventors: William L. Bain, Jr., Beaverton; Robert C. Bedichek, Hillsboro; George W. Cox, Portland, all of Oreg.; Gerhard Grassl, Land Bayern, Fed. Rep. of Germany; Craig B. Peterson, Portland, Oreg.; Justin R. Rattner, Beaverton, Oreg.; Gurbir Singh, Portland, Oreg.; Gurbir Singh, Portland, Oreg.; John L. Wipfli, Hillsboro, Oreg.

[73] Assignee: Intel Corporation, Santa Clara, Calif.

[21] Appl. No.: 46,633

[22] Filed: May 7, 1987

[51] Int. Cl.[4] ............................................. G06F 3/00
[52] U.S. Cl. .................................................... 364/200
[58] Field of Search ............................... 364/200, 900

[56] References Cited

U.S. PATENT DOCUMENTS 4,772,051 1/1988 Chattopadhya .................... 364/200

Primary Examiner—Raulfe B. Zache
Attorney, Agent, or Firm—Owen L. Lamb

[57] ABSTRACT

An I/O bus sequencer for providing a data path between an execution Unit (EU-10), a register file (14) and devices connected to a bus (28). A programmable logic array (PLA-18) stores a program which controls a service table (20). The service table includes a plurality of entries divided into fields. One of the fields when decoded instructs the PLA as to what kind of operation the bus sequencer is to perform. Line selection (priority) logic (22) connected to I/O request lines (30) and to the service table (20) determines which service table entry the PLA is to use. A bus interface connected to the I/O bus ports (26) and to the PLA (18) routes data between the I/O bus ports (26) and the register file (14), entries of which are controlled by use of register sets. The service table fields include register set descriptors for storing the status of register set buffers. The PLA decodes an ACCESS instruction to start an operation by loading the first register set descriptor, and then decodes sequential SUPPLY instructions to the entry. Each SUPPLY instruction loads an empty register set descriptor field to be used when the current register set descriptor field is exhausted.

3 Claims, 3 Drawing Sheets

PROGRAMMABLE I/O SEQUENCER FOR USE IN AN I/O PROCESSOR

CROSS-REFERENCES TO RELATED APPLICATIONS

Copending patent application Ser. No. 921,313 filed Oct. 21, 1986, of Bain et al., entitled "Memory based interagent Communication Mechanism" and assigned to Intel Corporation, the assignee of the present invention.

Copending patent application Ser. No. 942,608 filed 12/17/86, of Cox et al., entitled "Execution Unit With Multi-tasking Capability" and assigned to Intel Corporation, the assignee of the present invention.

BACKGROUND OF THE INVENTION

1. Technical Field

The present invention relates to data processing systems, and more particularly to apparatus for controlling data flow between an input/output bus and a local memory of an input/output processor.

2. Background Art

The above identified copending patent application Ser. No. 921,313 addresses the basic I/O problem of how to couple two different bus types and provide for data flow between these two buses. One of the busses is an I/O bus. On the I/O bus different devices having a spectrum of data rates generated by different peripherals must be handled. Some devices have the added problem of quiet periods followed by very busy periods with sharp transitions between the two periods.

In the past the I/O bus data transfer problem has been solved by using buffers for the data. For example, in the Capowski, et al. U.S. Pat. No. 3,699,530 granted to IBM on Oct. 17, 1972, multiple dedicated buffers are provided for each channel to ensure that all channels have an individual receptacle for receiving data which cannot be made unavailable due to transfers by other channels. Prior resolution of requests from channels control the use of the bus from the channel independently of subsequent priority resolution for use of the main storage. Once a channel transfers its storage address and data into its assigned dedicated buffer, that buffer, based on the storage address contained within it, enters storage priority for the particular logical storage unit desired. In this manner, the single queue of channel requests is rearranged into four independent request queues based on logical storage addresses.

This approach has the advantage that it does smooth out input/output transfers, but at the expense of requiring dedicated resources which are expensive. In modern very large integrated (VLSI) technology, chip space is at a premium and pin connections are limited. It therefore becomes important to reduce the amount of buffering provided on the chip while still maintaining data throughput efficiency. This is best achieved by providing shared rather than dedicated resources.

It is therefore an object of the present invention to provide an input/output sequencer to handle transfers between an I/O bus and a shared register file.

SUMMARY OF THE INVENTION

Briefly, the above object is accomplished in accordance with the invention by providing an I/O bus sequencer including a programmable logic array (PLA) and a program service table including a plurality of entries divided into fields, one of the fields containing means for instructing the PLA as to what kind of operation the bus sequencer is to perform. Line selection (priority) logic connected to I/O request lines and to the service table determines which service table entry the PLA is to use. A bus interface connected to I/O bus ports and to the PLA routes data between the I/O bus ports and a shared register file, entries of which are controlled by use of register sets. The service table fields include register set descriptors for storing the status of register set buffers. The PLA includes means for decoding an access instruction to start an operation by loading the first register set descriptor, and means for decoding sequential supply instructions to the entry. Each supply instruction loads the empty register set descriptor field to be used when the current register set descriptor field is exhausted.

The invention has the advantage that the register file is a shared resource; a pool of buffers which can be allocated and deallocated as the demands of the bus require. This results in less space needed on the chip. Further, speed is increased by passing register set descriptors rather than the data itself.

BRIEF DESCRIPTION OF THE DRAWINGS

The foregoing and other objects, features, and advantages of the invention will be apparent from the following more particular description of the preferred embodiments of the invention as illustrated in the accompanying drawings.

DESCRIPTION OF THE PREFERRED EMBODIMENT

Figure 1:
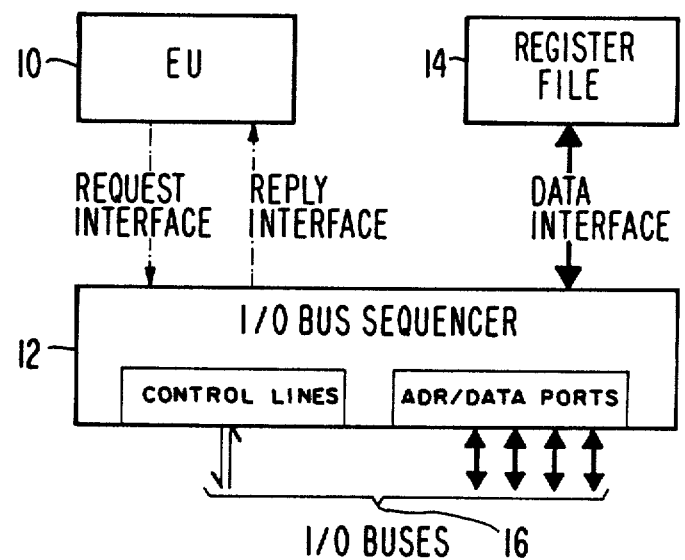
FIG. 1 is a functional block diagram illustrating how the I/O bus sequencer attaches to the I/O buses, the execution unit and the register file.

Referring now to FIG. 1, the I/O bus sequencer matches the I/O channel processor (CP) to the I/O bus.

The execution unit (EU-10) is a programmed processor with a pipelined instruction sequencer. The execution unit provides multitask dispatching, message passing, register set passing, and an instruction cache. The I/O bus sequencer (12) and execution unit (10) share a common memory, a register file (14). The register file is uniformly addressed and is composed of a number of multiported register sets. The register file provides the basis for logical and physical synchronization and mapped-task access. Byte, half-word, and word accessing is provided. Different tasks are mapped to use different register sets over time. The mix of tasks executing can change over time. The register sets being employed by a given task can change during the task execution, either under its control by changing its own mappings or with other tasks by passing register sets back and forth as messages or by being swapped. More detail about the execution unit can be found in the above-identified copending patent application Ser. No. 942,608. More detail about the register file can be found in the above-identified copending patent application Ser. No. 921,313.

Local bus and I/O Bus Sequencers

As described in the above referenced application Ser. No. 921,313, there are two modules to accomplish communication with other devices: the Local Bus Sequencer (LBS) and the I/O Bus Sequencer (IOS). They facilitate communication with the CS (Computational Subsystem) and the I/O subsystem, respectively.

The following steps occur to effect a transfer (Note: the third and fourth steps may occur in the opposite order than listed here):

1. The EU executes an access instruction. This instruction issues a request to one of the sequencers. The task may block until the sequencer can accept the request.
2. The sequencer performs the requested operation. This instruction usually results in data being transferred into or out of the register file.
3. A task executes an instruction which blocks until the sequencer signals completion. This task may or may not be the task that issued the request.
4. The sequencer signals the completion of the operation.
5. The task unblocks and resumes execution at the synchronizing instruction.

ACCESS Instruction

The ACCESS instruction is the means by which the execution unit makes requests to the IOS and the LBS. The ACCESS instruction provides the necessary information to either sequencer so that the sequencer can do the data transfer. The information provided is:

sequencer code
reply method
supply variant (only for the IOS)
length
command
reply task
reply register set
physical address (32-bit for LBS; 24-bit for IOS)
data pointer The sequencer code informs the hardware which sequencer the access is bound for. Codes from 0 to 9 specify a line in the I/O Service Table. Codes 13, 14, and 15 are to the LBS.

The reply method bit tells the sequencer how to signal the completion of a request. The supply bit is used only by the IOS (it is ignored by the LBS). It tells the IOS that the access is part of a block transfer. Length tells how many bytes to move in the transfer. Command tells the sequencer what it is supposed to do. Reply task tells which task is to be replied to. Reply register set tells which register set in the reply task is to be replied to. The physical address is the location on the I/O bus where the transfer will begin. The data pointer is the register file physical address of the first byte of data.

Figure 6:
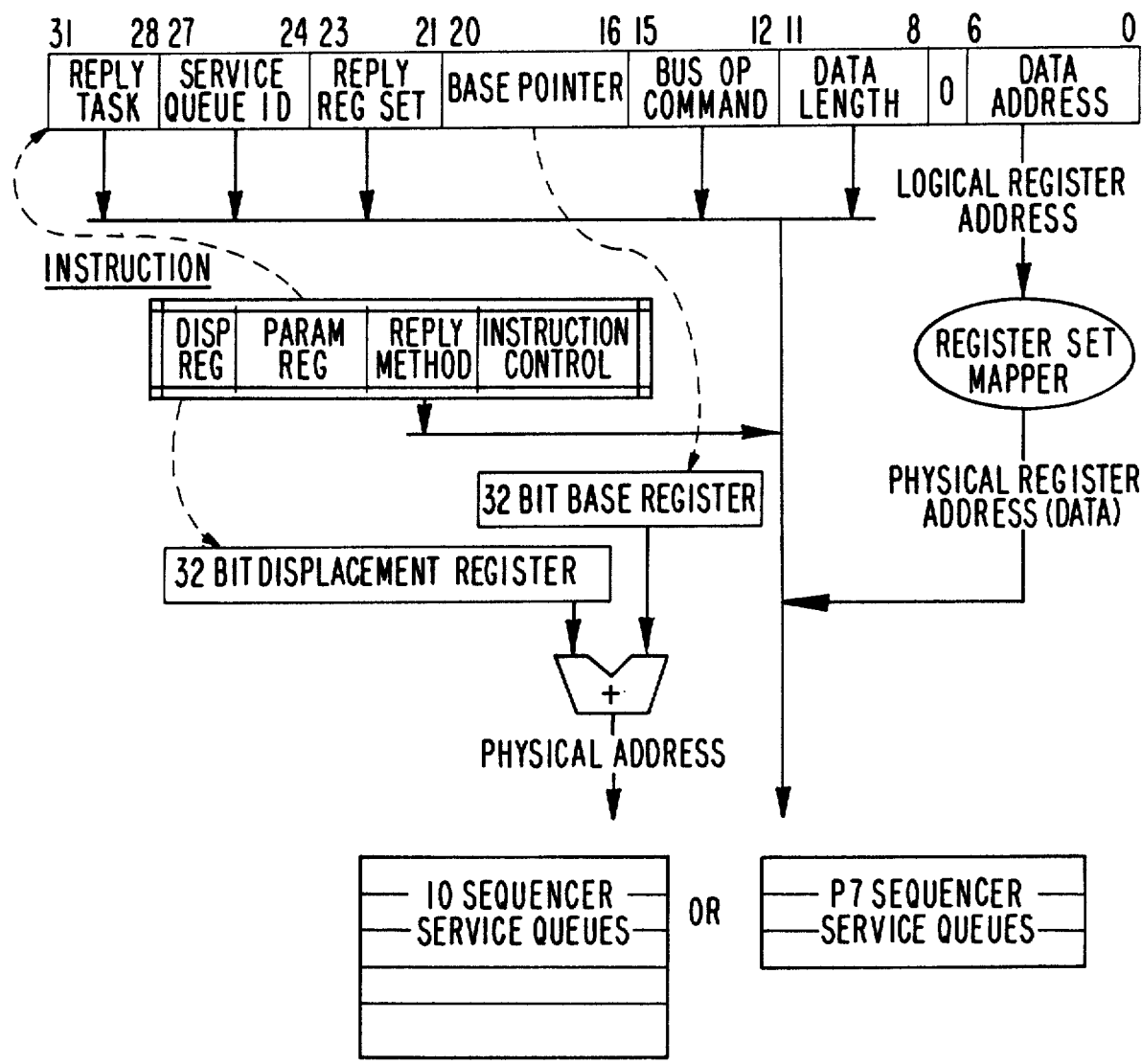
FIG. 6 is a block diagram illustrating the access instruction operation to the I/O service table of FIG. 2.

The information described above is generated from parameters and fields of the ACCESS instruction. The instruction contains a pointer to a 32-bit parameter register which holds some of the information necessary for the sequencers. FIG. 6 shows a typical ACCESS instruction and parameter register and how the information needed by a sequencer is generated.

The first six pieces of information described above come directly from either the instruction or the parameter register. The data pointer is generated by taking the logical byte in the parameter register and passing it through the Register Set Mapper to produce a register file physical address.

The 32-bit physical address needed by the sequencers can be generated in three different ways.

FIG. 6 shows the physical address being generated by adding a 32 bit displacement to a 32 bit base address. The pointer to the displacement register is in the instruction and the pointer to the base address is in the parameter register.

The physical address can also be generated by using the pointer to the displacement register as a literal value. This 8-bit literal value is added to the 32-bit base address, allowing positive literal displacements up to 255.

The third way is direct physical addressing. The base address pointer in the parameter register is ignored and the 32 bit value in the displacement regiser is used as the physical address.

The way the physical address is generated is chosen by bits in the instruction.

If a sequencer cannot accept an access request, the ACCESS instruction will block and will be retried when the sequencer can accept a request. Conditions that cause a sequencer to not accept a request are described in the sections for each sequencer.

The ACCESS instruction always locks the logical register set that the task is giving to the sequencer. This keeps both the task and the sequencer from operating on the register set at the same time.

Bus Sequencer to EU Synchronization

There are two methods for synchronizing transfers between the I/O bus sequencer and the EU: register set locking and microport messages. The LB sequencer always synchronizes with the EU using register set locking. Selection of the desired method is made by the EU code that issues the ACCESS instruction for a particular bus operation. The supply variant can not change the method, so a particular data stream either uses register set locking or microport messages, not both.

Message Based Synchronization

Figure 4:
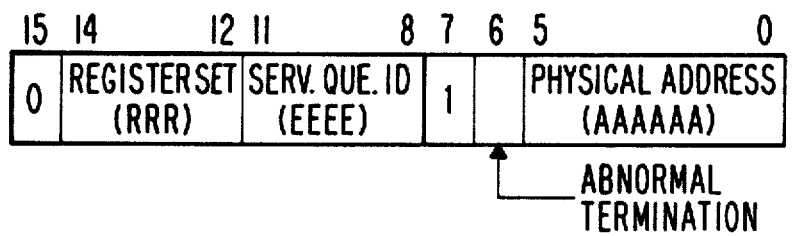
FIG. 4 is a diagram of the format of sequencer messages.

When this option is chosen the sequencer sends a microport message to the target task. The target task is specified by the task that executes the ACCESS instruction. The message is delivered in the sequencer format which is shown in FIG. 4.

The message is 16 bits long and the high-order bit is always 0. The bottom six bits of the lower byte of the message contain the physical address of the register set that was involved in the transfer. The bit above the register set physical address (bit 6 in the byte) contains the abnormal termination bit. This bit will be set by the sequencer if the sequencer operation terminated abnormally. In the lower byte the top bit (bit 7) is always 1. The bottom four bits of the upper byte identify which sequencer the message came from. The next three bits (the logical register set) contain the value the sequencer was passed as the reply register set.

The message is designed to be compatible with the MOVE POINTER instruction. By putting a MOVE POINTER instruction immediately after the RECEIVE, the register set that just participated in the transfer can be mapped into the logical space of the target task.

Register Set Based Synchronization

When this type of synchronization is requested, the sequencer will write the physical address of the involved register set into the 'reply register set' pointer in the mapper of the 'reply task'. Both the 'reply register set' and the 'reply task' were specified to the sequencer when the request was started. When it writes the register set pointer it will also set the abnormal termination bit in that pointer if the access terminated abnormally. In all cases the register set pointer has its valid bit set (i.e., the register set is unlocked).

Local Bus Sequencer

All communications and transfers to and from the system or local bus side of the I/O processor go through the local Bus Sequencer. The local bus sequencer is more fully described in the above-identified copending patent application Ser. No. 921,313.

I/O Sequencer

The I/O Sequencer (IOS) provides the path to the I/O bus. FIG. 1 shows the position of the IOS (12) relative to the other components that it communicates with. The IOS transfers data between the I/O buses (16) and the register file (14) and is configured to handle different protocols on the I/O bus. It can transfer blocks of data between the register file and a single location or a set of contiguously addressed locations in the address space of the I/O bus. It can also handle interrupts and DMA requests.

Functional Overview

The IOS, functionally, transfers the contents of a register set to (or from) the I/O bus, while generating the necessary control signals required by the protocol of the bus. The IOS supports the concept of 'block' transfer operations. Large blocks of data are transferred in smaller pieces, each large enough to fill a register set. The ACCESS instruction starts the transfer by passing the first register set from the EU to the IOS. The subsequent register sets, that form part of the same transfer, are passed to the IOS using the supply variant of the ACCESS instruction. The IOS maintains a number of two deep queues to hold the information from ACCESS and subsequent supply variant instructions. This enables the IOS to double buffer the data and maintain a high rate of data transfer without introducing any delays while awaiting the arrival of the next register set from the EU.

Transactions can also be started by events on the I/O bus. This facility is used in servicing interrupts and DMA requests.

Structural Overview

Figure 2:
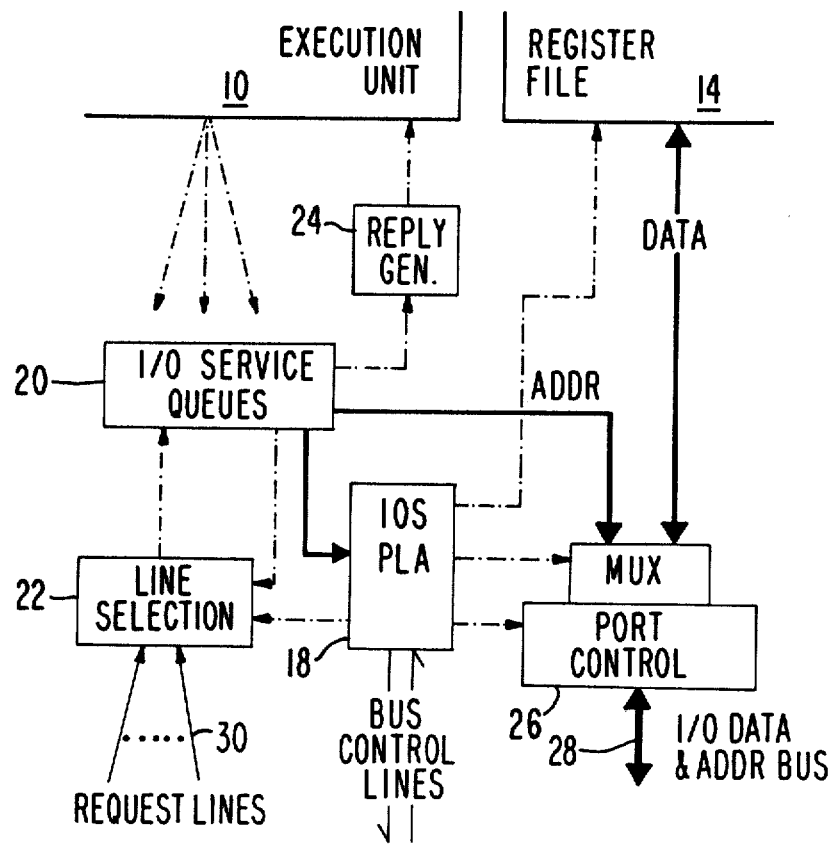
FIG. 2 is a more detailed block diagram of the I/O bus sequencer shown in FIG. 1.
Figure 3:
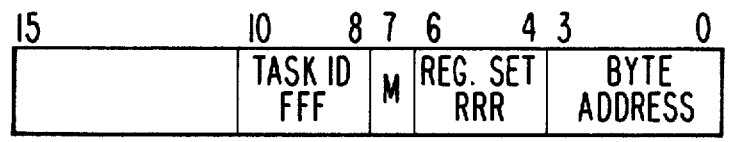
FIG. 3 is a diagram of the format of indirect addresses.

The I/O Sequencer (IOS) shown in FIG. 2 contains five major components: The IOS PLA (Programmable Logic Array-18); the I/O service queue or table (20); the line selection logic (22); the reply generation logic (24); and the I/O address and data bus interface (port control-26). The PLA program is stored in ROM cells and it controls the sequencing of the IOS. The service table (20) is the entity through which the EU (10) communicates with the IOS. The service table contains ten entries and each entry is divided into a number of fields. One of the fields tell the PLA what kind of operation the sequencer is to perform. When multiple service table entries have been set up, the line selection logic (22) determines which entry the PLA (18) should use. The bus interface (26) routes the transfer data between the register file (14) and the four I/O bus ports under the control of the PLA.

The sequencer goes through the set of steps shown below. It continually repeats these steps.

1. The bus selection logic selects a valid Service Table Entry (20) for the IOS PLA (18).

2. PLA (18) reads the command field of the selected entry. This command field tells the PLA where to start executing in it's microcode.
3. PLA executes a sequence of operations possibly directing the Bus Interface (26) to move data between the I/O Bus (28) and the register file (14).
4. PLA adjusts address pointers and determines if all the data has been transferred from the register set. If not, operation continues at step 1.
5. The PLA sets a flag in the I/O service queue (20) which triggers the reply generation logic (24) to notify the target task in the EU (10) of the completion of the operation.

Service Table

The service table (20) is the main part of the IOS that is visible to the EU programmer. It is through the service table that a programmer tells the IOS what operation to perform. The EU can load requests into the service table by issuing the access or SUPPLY instructions. The state of execution of a request can be monitored by reading the service table entries via the ACCESS LOCAL instruction of the EU.

Service Table Structure

Figure 5:
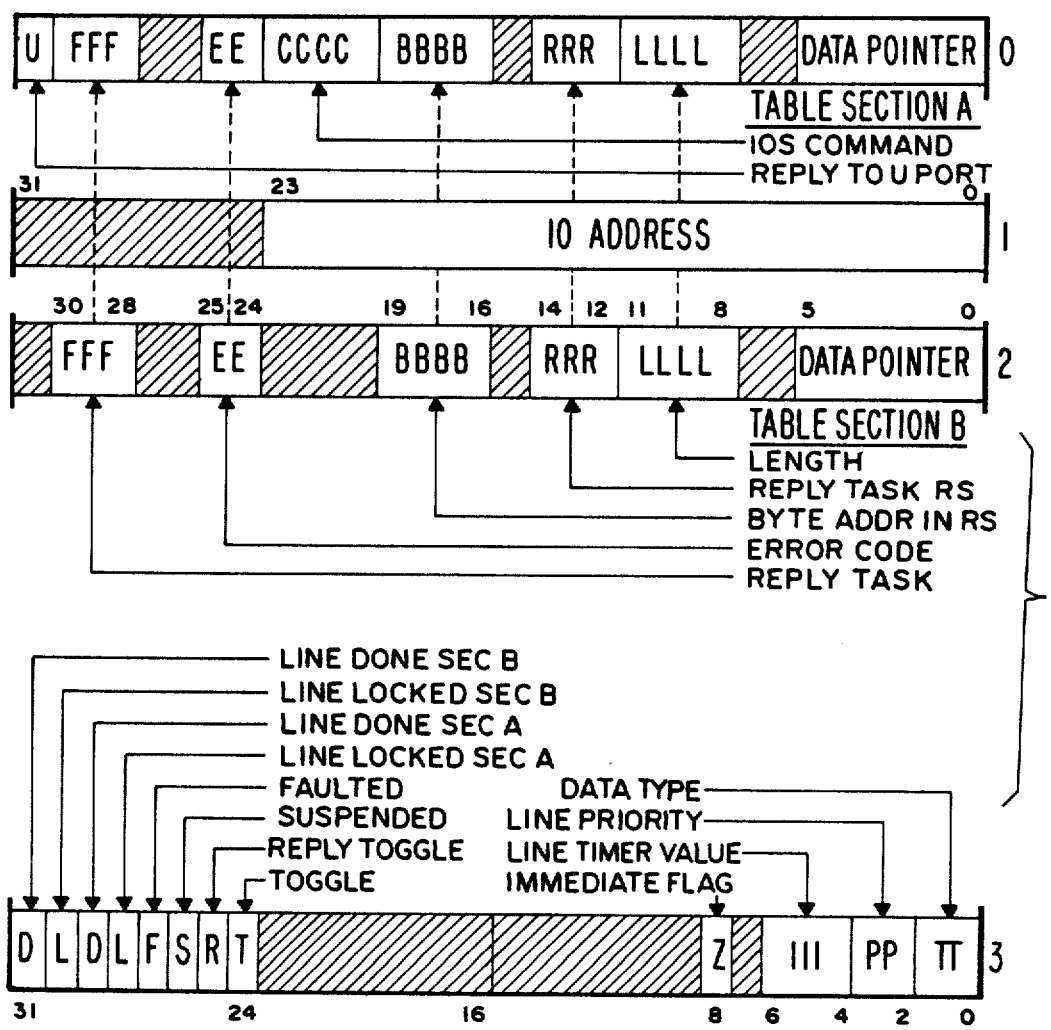
FIG. 5 is a block diagram of the service table fields.

The Service Table (20) in the IOS is made up of ten identical entries or lines. FIG. 5 shows the fields of each entry. An entry can be divided into three sections distributed over four 32-bit words: the static section that holds information that is part of every transfer associated with that entry and two identical Register Set Descriptors (A and B) that can store the status of two buffers that are used in a block transfer. Some of the fields of the various sections of an entry can only be loaded by local accesses, while others are loaded by the access or SUPPLY instructions. All service table fields can be read by local accesses.

The fields of the static section of the entries are: priority- The priority field is a two bit ordinal; it has values 0, 1, 2, and 3 and is loaded by local accesses. The value in this field helps determine when an entry will execute.

timer—The timer field is three bits wide and is loaded by local accesses. The value in this field can be used to govern the durations of the control signals on the I/O bus, when executing a command in the line, and will be determined by the speed of the devices that are addressed by that line. The value in this field will add as many clock periods to the minimum durations of the control signals. The minimum durations are determined by the PLA sequences.

toggle—The toggle bit determines which one of the two register set descriptors is in use.

reply toggle—The reply toggle bit is used by the reply generation logic to determine which one of the two register set descriptors must reply next.

type—The type field is two bits wide and is loaded by local accesses. It can have three values: byte, halfword, and word. This field determines how addresses and lengths are changed when doing transfers. The I/O address and the physical byte pointer are incremented by 1 if the type field has the value 'byte'. The value 'halfword' increments them by 2 and 'word' increments them by 4. The length field is decremented by the corresponding amounts.

suspended—This bit is set by the reply generation logic when during a reply to microport the microport is found to be full. When any microport empties, all suspend bits are cleared and the replies are retried.

faulted—The faulted bit signifies that the entry has returned a reply that was marked 'abnormally terminated'. This bit gets set whenever the IOS replies with abnormal termination. If a SUPPLY instruction is executed and this bit is set the instruction will cause a context level fault. The 'faulted' bit is reset by the hardware whenever an ACCESS instruction to the line is accepted. This bit is used to implement the block transfer semantics.

I/O address—The I/O address field is twenty-four bits. It is loaded by the ACCESS instruction and contains an address which can be driven onto the I/O bus. This address can be incremented under control of the PLA. The amount that the address is incremented by depends on the setting of the type field (see its description).

immediate—The immediate bit has two values: latent and immediate. It helps to determine how an entry becomes ready to execute. If it is immediate the entry is ready to be selected as soon as the access is issued. Otherwise, the external stimulus with which the entry is associated controls its ability to execute. This bit is loaded by the access local instruction.

IOS command—The IOS command field is four bits wide and is loaded by the ACCESS instruction. The value in this field is read by the PLA and determines what operation the PLA will perform. These operations are defined by the PLA code and may be different from one application to the next.

reply method—The replay method bit has two values, controlled by the access instruction: register set locking and message. It controls which mechanism is used by the IOS to reply to the EU when a transfer has completed.

Each service table entry has two register set descriptors (see FIG. 5). Each descriptor contains all of the information about a piece of the data stream up to sixteen bytes long. While one descriptor is being used to control the transfer, the other can be loaded by the EU. They both have the following fields, of which the first four are loaded by the ACCESS instruction or its supply variant.

physical byte address—The physical byte address field is nine bits long and is broken into two sub-fields. A five-bit sub-field, the data pointer, identifies the register set to be used. The second sub-field is four bits wide and it points to a byte in the register file. This field is incremented under control of the PLA. The amount of the increment is specified by the type field.

reply task—The reply task field is three bits wide. It names the task frame that will be signaled when an operation completes.

reply register set—The reply register set field is three bits. In the case of register-set based synchronization it names the logical register set in the target task's address space to be unlocked when an operation completes. With message based synchronization this field will be returned in the message.

length—The length field is four bits. It contains the value of the number of bytes left for an operation to transfer. The values zero through fifteen represent one through sixteen bytes left to transfer respectively. Thus, there is no value to represent zero bytes to transfer. This indication is instead made by a reset ready bit. The length field can be detcremented by the PLA. The amount of the decrement is specified by the type field (see its description).

lock—The lock bit indicates whether the descriptor in which it lies has useful work to perform. The bit is set when an access or SUPPLY instruction is accepted by the IOS. An access will block if either descriptor's lock bit is set while a SUPPLY will block if they are both set. The lock bit gets reset by the hardware whenever the IOS sends a normal reply for that entry.

done—The done bit indicates that the IOS PLA has completed operating upon the request in the table section, and is used to signal the reply generation logic to send a message to the EU. The lock bit is reset by the reply logic when it has successfully completed its reply. If the reply is rejected, due to a full microport, the lock bit stays set and the suspend bit is also set.

reply code—The reply code is a two bit register. Each bit can be set or reset by the PLA. The encodings of these bits are like the command field; they are determined by PLA programs. Whatever their specific encodings are, however, nonzero values indicate an abnormal condition.

Data Alignment Restrictions

Half-word and word operands must be located at the appropriate type boundaries in the register file. If the operand type and the least significant bits of the physical byte address indicate that this requirement has been violated then no data is transferred. In these cases data read from the I/O bus is not written into the register file while undefined data is placed on the bus for a write operation.

If the length value causes the physical byte address to cross the boundary of the register set, the address will wrap around within that register set and not overwrite the adjacent registers.

Pipelining Transfers with the Supply Variant

The IOS has the ability to transfer the contents of a stream of register sets without having to execute an instruction after the transfer of one register set to induce the next one to be transferred. The instruction to supply the IOS with a fresh register set can be issued while the IOS is still transferring the previous one. This feature eliminates interruptions in the stream between consecutive register sets. Also, it relieves the EU of severe temporal constraints that it would otherwise be burdened with, when dealing with devices without buffering. To support this ability we have the supply variant of the ACCESS instruction. The operation of this instruction is shown in FIG. 6. It has the following form:

supply ( sequencer_code: cardinal,
   reply_task: task_id,
   reply_reg_set: cardinal,
   length: cardinal,
   logical_byte: address )

An ACCESS instruction is always issued to start an operation in the IOS. After an ACCESS instruction has loaded most of the static fields and register set descriptor set A of a service table entry, an arbitrary number of SUPPLY instructions may be issued to this same entry. This is useful for both latent commands and immediate commands. It has the same form and semantics as the ACCESS instruction except for the following:

1. No I/O address computation is done.
2. The command field in the service table is unchanged and the corresponding field in the parameter register is ignored.
3. The reply method and latent bits in the service table are unchanged.
4. The register set descriptor which is loaded depends on the lock access lock access lock bits (access always loads descriptor A).

5. A context level fault is generated if the faulted bit is access access set when this instruction is executed (access clears the fault bit).

The ACCESS instruction starts the stream of data between the I/O bus Supply and the register file. Supply instructions provide the rest of the register sets, to continue the stream without interruption. Each SUPPLY instruction loads the empty register set descriptor to be used by the IOS when the present one is exhausted. A sequence that an EU program doing a block transfer with a device on the I/O bus looks like this:

```
access( ... buff_1 ... )
...
supply( ... buff_2 ... )
...
supply( ... buff_i ... )
...
```

The string of SUPPLY issuances may continue indefinitely. If the supply of register sets ends, because SUPPLY's stop being issued, the supply access transfer will stop until another SUPPLY or ACCESS instruction is issued.

If both descriptors are exhausted before the next SUPPLY instruction is issued, data underrun or overrun may occur in the device being dealt with on the I/O Bus. The IOS, however, is oblivious to this and will start transferring again when it receives another register set to fill up or empty out. If both descriptors are full and a SUPPLY instruction is executed, the issuing task will block until one of the descriptors becomes empty. Thus, the SUPPLY instruction blocks exactly as the ACCESS instruction does.

When a descriptor is exhausted the PLA directs the reply mechanism to reply to the EU. It may take an indefinite period for this to occur. The reply mechanism works in parallel with the rest of the IOS, so the transfer will not be affected right away. If, however, the reply takes a long time (because, for example, the microport of the target task is full) the other descriptor could become exhausted before the first one has completed its reply. The reply mechanism insures that the replies from a given entry will be sent in order. That is, even if the second descriptor specifies a target task with an empty microport to which the reply mechanism could send to, it will wait for the first one to complete successfully. The other entries are unaffected by suspended replies and the PLA is not aware of them. There is no ordering of replies between different entries.

If the IOS replies to a task with a faulted buffer, any further SUPPLY instructions to the particular line that had a problem will be faulted. This supports the 'block' transfer semantics of the IOS.

Immediate and Latent Requests

When the EU issues a request to the IOS it specifies whether it should be executed immediately or whether the execution should be blocked until some external request pin becomes active. The immediate bit in the ACCESS instruction is set to indicate an immediate request and reset for a latent request.

The ten service table entries are permanently associated with ten request and acknowledge pairs of signal lines on the I/O bus. The latent requests can either provide a signaling primitive (like interrupts) or a block transfer primitive (like DMA) to the EU programmer. The IOS's response to these requests is controlled by the PLA program. In most applications, the action that this program takes will be determined by the value of the command field in the service table entry that is selected as a result of the active request pin.

Service Table Scheduling

Service table scheduling is the process by which one of the ten entries in the service table is selected for execution by the PLA. This section describes this process.

The line selection logic is an autonomous block of logic that continuously monitors all entries in the table and the corresponding request input signals to make its selection. Whenever the IOS PLA completes one transaction, it begins operating upon the entry that has been selected by the selection logic.

In each service table entry there is a bit called lock. This is set whenever an access or SUPPLY instruction loads the entry. It is reset under control of the PLA. The entry selection mechanism uses this bit to determine which entries should participate in the priority resolution. It indicates that an entry is ready to execute. Only entries with set lock bits and reset suspend bits are candidates for selection. The line scheduling logic provides priority selection, with round-robin among lines of equal priority, as follows.

1. A:=set of entries with set lock bits and reset done bits.
2. B:=(elements of A that contain immediate requests) AND (elements of A with latent requests whose request pins are active)
3. p:=MAX ( prioritylevel ( b ) ) for all b in B
4. C:=elements of B at priority level p
5. S:=next element of C where S is the entry that is selected.

Bus Interface

The bus interface (26) of the IOS consists of 48 pins, divided into six fields. Four of these are 8-bit wide ports, A through D, and provide bidirectional data paths between the register file and the I/O bus. One of the fields is eight bits wide and comes from the output of the IOS PLA. This set of outputs provides the control signals for the I/O bus. The next field has six bits that are inputs to the PLA and can be used for status and handshake signals from the I/O bus. One request input signal is connected to a dedicated pin. An output control signal, Byte High Enable, is also provided to hamdle byte wide data transfers when the I/O bus is configured to be sixteen bits wide.

The ports, A through D, are composed of two latches, with tri-state drivers, such that they can simultaneously buffer data in both directions. The operation of these latches is controlled by the port control table. The table is a combination of ROM and RAM with sixteen locations, addressed by the PLA. The entries in the table have four 3-bit fields, that control the corresponding ports. The individual ports can perform the following operations:

Latch incoming data.
Latch outgoing data.
Transfer latched incoming data to the register file.
Drive latched output data on to the I/O bus.
Latch incoming data and simultaneously forward it to the register file.
Latch outgoing data and drive it on the I/O bus.
Perform no operation.

The 'I/O address' from the service table entry can also be driven on the I/O bus, via these ports.

A facility is provided whereby the IOS can interface to a synchronous bus and data can be latched in the ports by an external signal. When the IOS is programmed for this mode of operation, one of the PLA input pins changes its function to a latch-in signal. The ports, so programmed, can now be loaded by a strobe pulse on this line. The pulse also sets a latch at the PLA input, indicating that data is available at the ports.

Some of the pins at the bus interface can also serve as DMA or interrupt request/acknowledge signal pairs. Ports C and D, two of the PLA inputs, and two of the PLA outputs can be used for this purpose. Each line in the service table is associated with a request pin and an acknowledge pin at the bus interface. The function of a pin is controlled by a register in the local space. Each pin can either be used as part of the req/ack pair or in its 'normal' mode. Pins that are 'programmed' to be request pins are also programmed to be either level or edge sensitive. Acknowledge lines are controlled by the PLA. When a service table line gets activated by a request pin, the associated acknowledge pin is marked as the current one. Then if the PLA says to drive the acknowledge, the appropriate pin will be driven in the appropriate direction.

While the invention has been particularly shown and described with reference to preferred embodiments thereof, it will be understood by those skilled in the art that the foregoing and other changes in form and detail may be made therein without departing from the spirit and scope of the invention.

What is claimed is:

1. In a data processing system having I/O devices connected to an I/O bus, a register file (14), and an Execution Unit (EU-10) which executes a plurality of tasks comprised of a sequence of instructions;
    said tasks including a sending task and a destination task;
    a bus sequencer (12) for providing a data path between said devices and said register file (14), comprising:
    PLA means (18) for storing a program;
    service table means (20) connected to said PLA means, said service table means including a plurality of service table entries divided into service table fields (FIG. 5), one of said service table fields (IOS command) containing means for instructing said PLA as to what kind of operation said bus sequencer is to perform;
    a plurality of I/O request lines (30);
    line selection logic means (22) connected to said I/O request lines (30), to said PLA means (18), and to said service table means (20) for determining which service table entry said PLA means is to use; and,
    bus interface means (26) connected to said I/O bus (28), said register file (14), and to said PLA means (18) for routing data between said register file (14) and said I/O bus (28);
    each one of said service table fields further including first and second register-set descriptors (Table section A, table section B, FIG. 5), each register set descriptor including means for storing first bits (data pointer) which identify a register set buffer in said register file (14) and second bits indicative of the status of said register set buffer,
    said PLA (18) including means for decoding an ACCESS instruction to start an operation by loading said first and second bits of said first register-set descriptor, and means for decoding a first SUPPLY instruction of sequential SUPPLY instructions to continue said operation by loading said first and second bits of said second register-set descriptor,
    each subsequent SUPPLY instruction being decoded by said PLA to continue said operation by loading said first and second bits of whichever one of said first and second register-set descriptors corresponds to an empty register set buffer.

2. The combination in accordance with claim 1 wherein each of said service table entries includes a reply toggle bit and a suspended bit, and each of said register set descriptors includes a reply task field, said combination further comprising:
    a reply generator (24) connected to said service table means (20) and to said Execution Unit (10), said reply generator including means responsive to said reply toggle bit for determining which of either said first or second register set descriptors must reply, and including means responsive to said reply task field for naming said destination task in said Execution Unit (10);
    said reply generator further including means for setting said suspended bit to thereby indicate that an attempt by said reply generator to reply to said destination task has failed.

3. The combination in accordance with claim 2 wherein each of said service table entries includes a line locked bit associated with each one of said first and second register set descriptors, said bus sequence further comprising:
    means in said line selection logic (22) to select a service table entry;
    means in said selection logic (22) for signaling said PLA when an entry is selected and its IOS command field is available for said PLA to read;
    said PLA means for decoding an ACCESS instruction and said PLA means for decoding a SUPPLY instruction further including means for setting said lock bit whenever an ACCESS or SUPPLY instruction loads said register set descriptor;
    said reply generator (24) further including means for resetting said lock bit; and,
    entry-selection means in said line selection logic (22) responsive to said lock bit and to said suspend bit for determining which entries should participate in priority resolution by said line selection logic (22), such that only entries with set lock bits and reset suspend bits are candidates for selection.

* * * * *